Patented Mar. 12, 1946

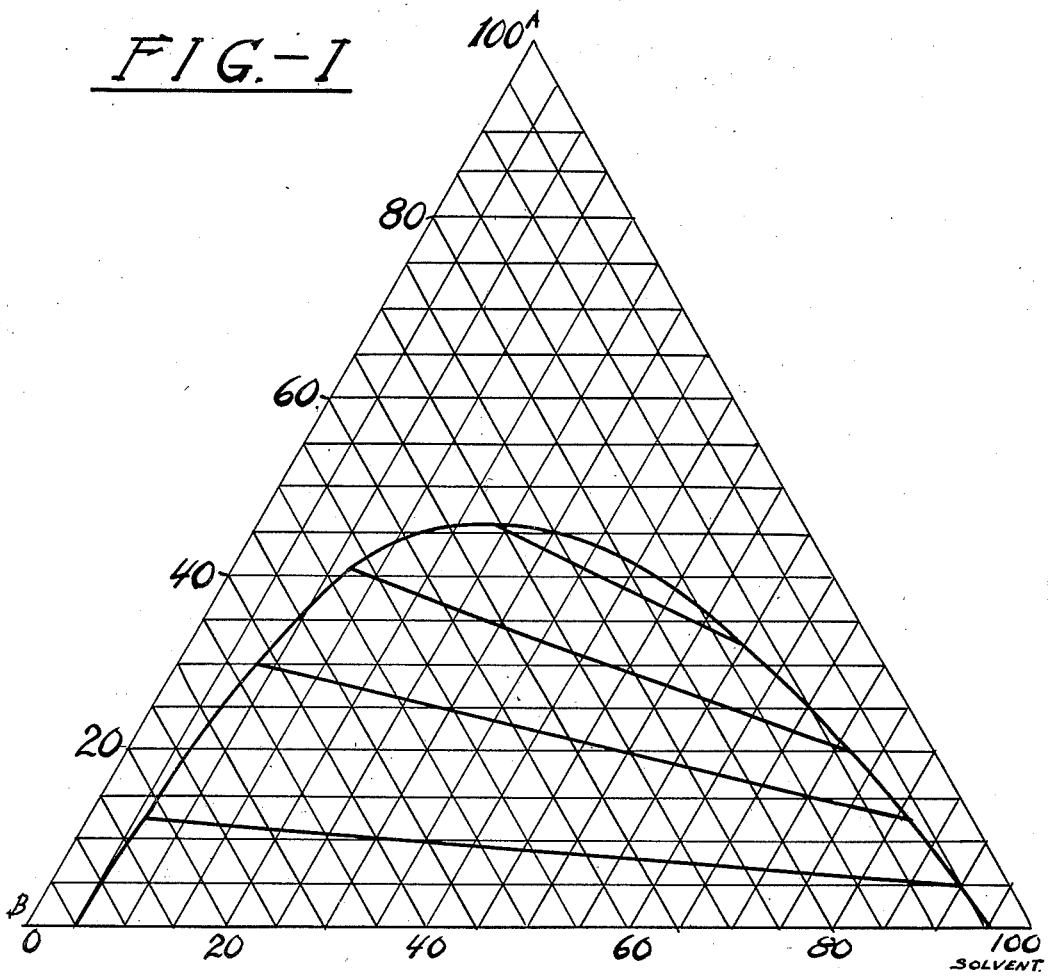

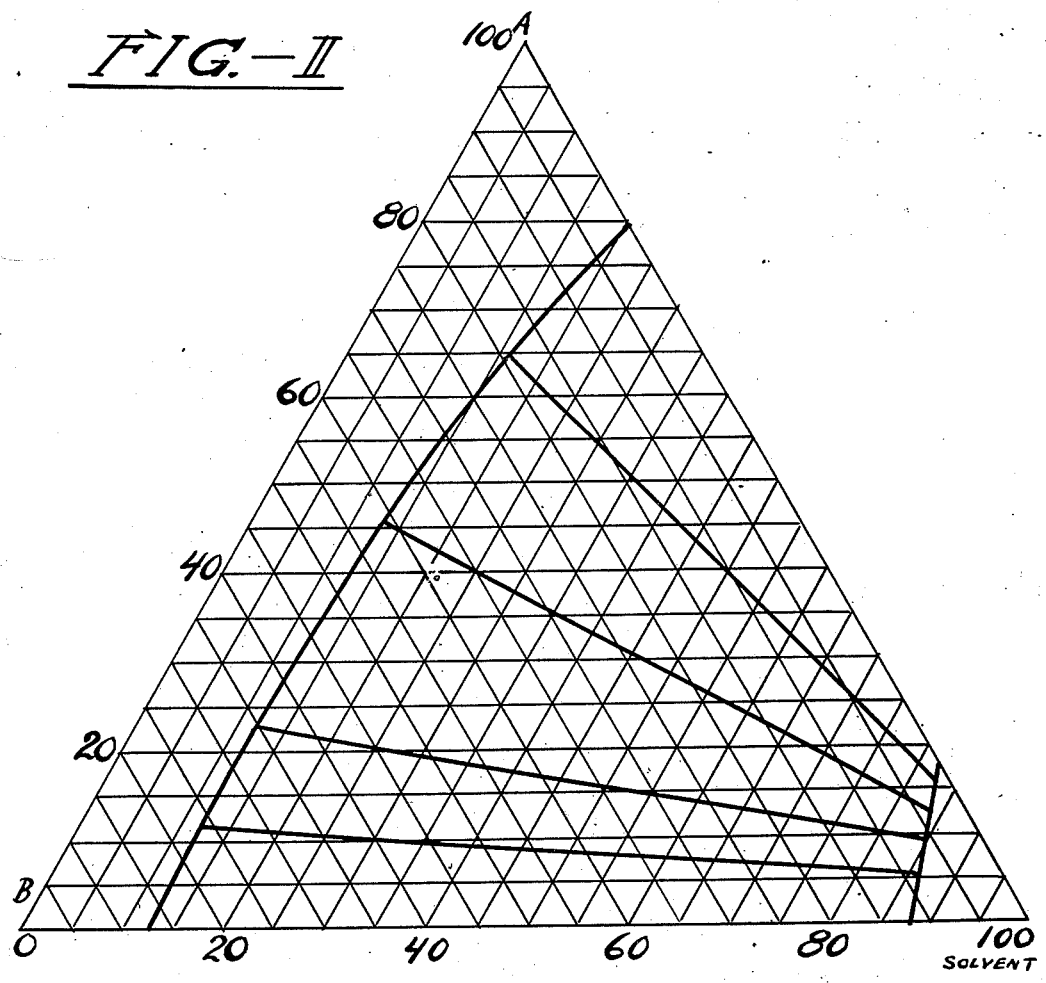

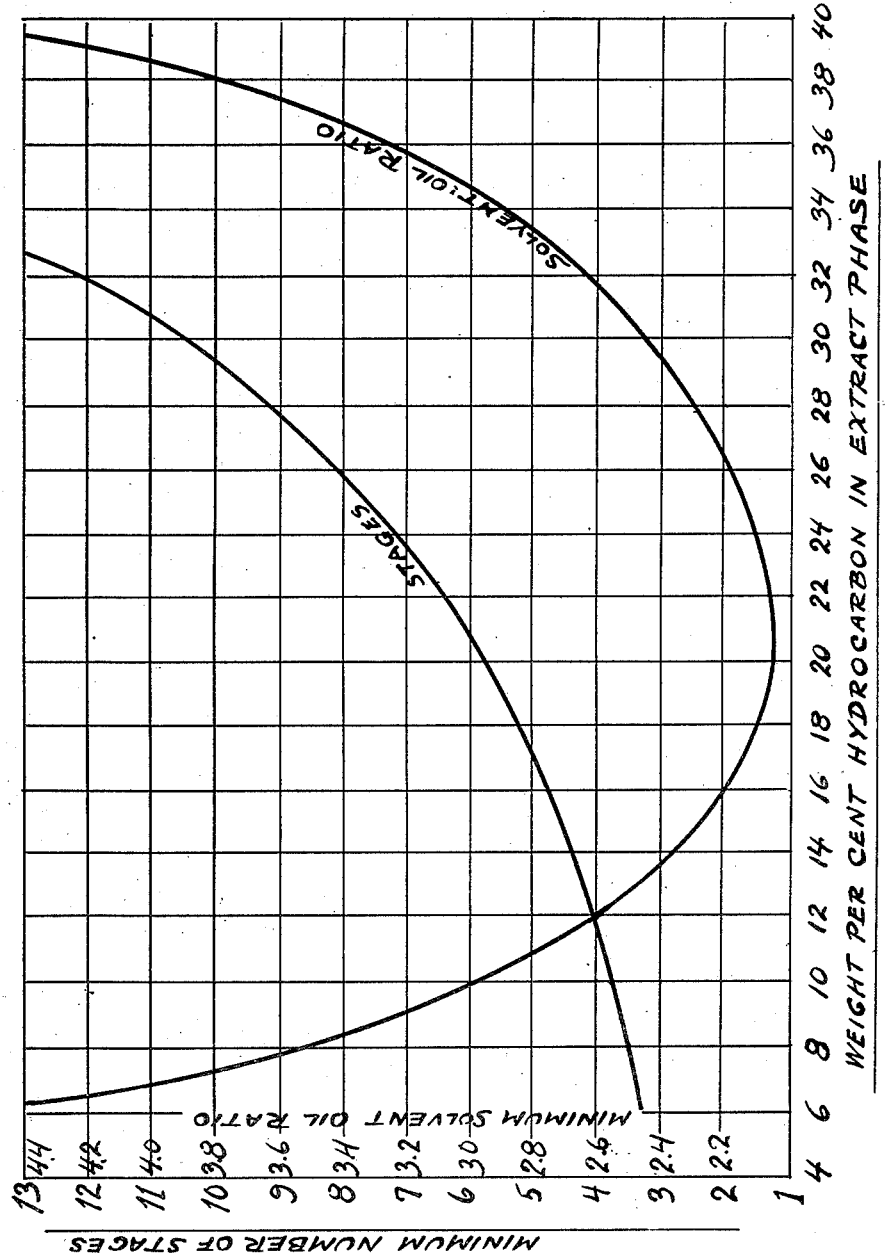

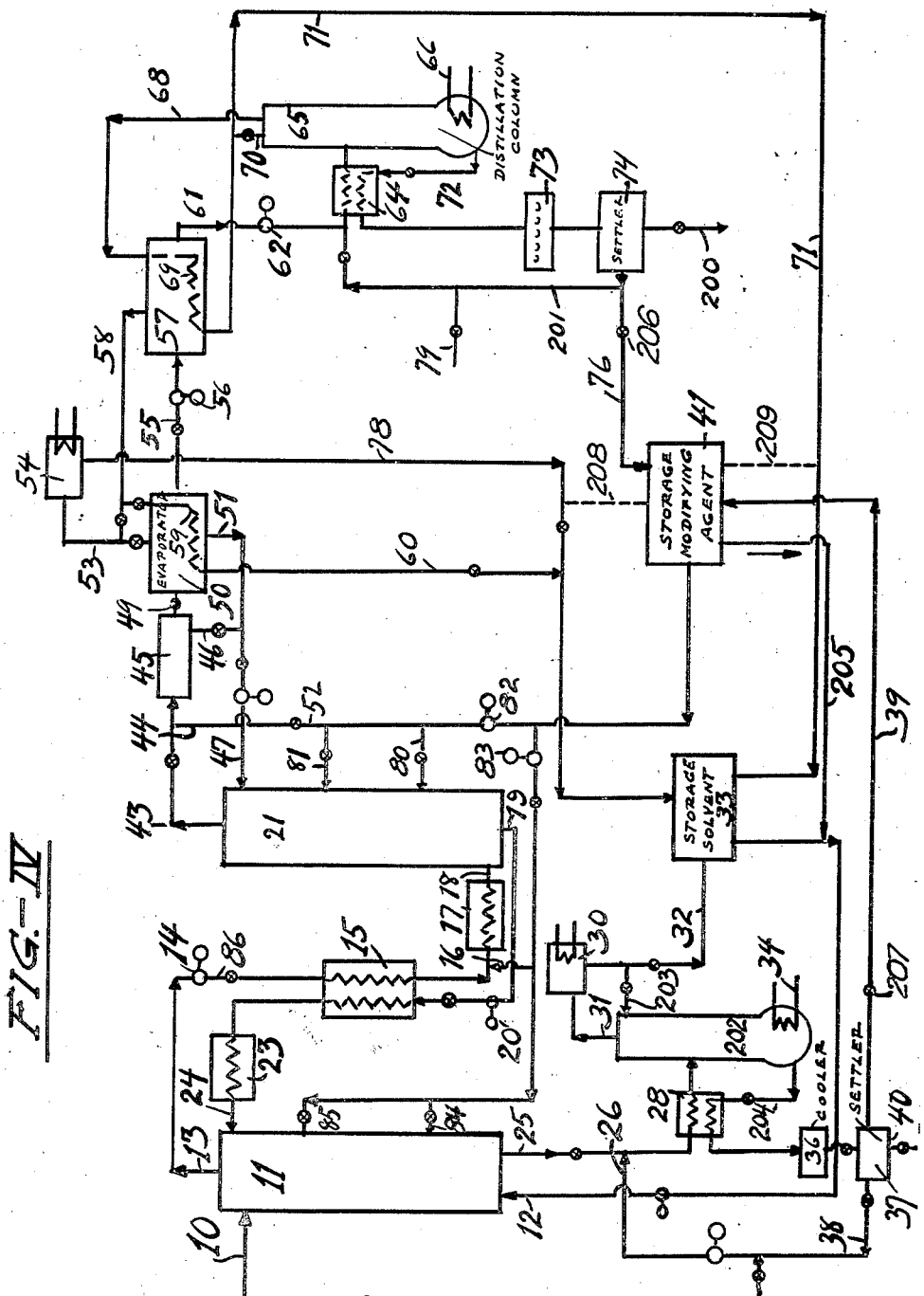

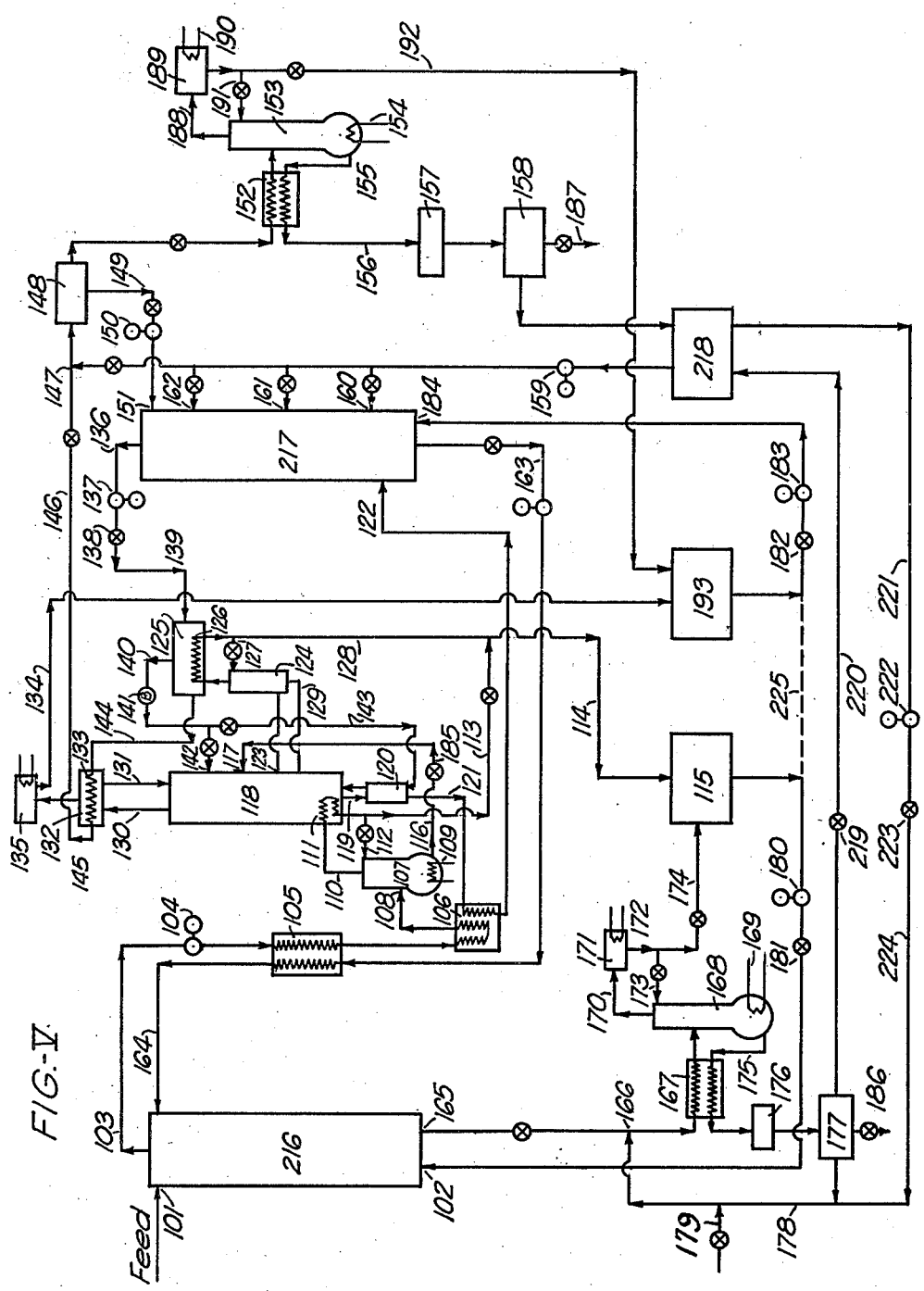

2,396,299

UNITED STATES PATENT OFFICE 2,396,299

REFINING HYDROCARBON OILS

William J. Sweeney, Elizabeth, N. J., and Merrell R. Fenske and George H. Cummings, State College, Pa., assignors of one-half to Standard Oil Development Company, a corporation of Delaware, and one-half to Röhm & Haas Company, a corporation of Delaware Application August 21, 1940, Serial No. 353,448

21 Claims. (Cl. 196—13)

The present invention relates to a process for the separation into their respective constituents of liquid mixtures containing molecules varying in molecular structure and weight. It is more particularly concerned with a process for extracting hydrocarbon mixtures such as mineral oils to yield fractions having different chemical and physical properties. The invention is especially applicable for the treatment of relatively non-viscous petroleum oils or fractions obtained therefrom by the various refinery processes, such as distillation, thermal or catalytic cracking, hydrogenation or dehydrogenation, polymerization, alkylation operations and the like. It is, furthermore, generally applicable to mixtures that heretofore were treated with liquid sulfur dioxide or sulfuric acid. The term mineral oil is used to denote mixtures that are predominantly hydrocarbons, such as exist in petroleum or its fractions, or in hydrocarbon mixtures obtained from the processing of carbonaceous materials, such as coal, petroleum, or its fractions. It is understood that other elements, such as oxygen, nitrogen, and sulfur, are present in mineral oil, and that compounds containing these as well as the various hydrocarbons, may be separated according to this invention. In accordance with the present process, mineral oils, particularly petroleum hydrocarbon liquids obtained from any source, are treated in a manner to segregate the mixtures into their respective constituents, utilizing a particularly desirable solvent which comprises ammonia and a substance having the ability to control the solvent power of the ammonia within definite critical limits.

It is well known in the art that mineral oils such as petroleum oils contain various types of hydrocarbon constituents which may be generally classified as having paraffinic, aromatic, hydro-aromatic or naphthenic, and unsaturated structures which vary over wide ranges in molecular weights. It is also well-known in the art to segregate these oils, particularly petroleum oils, into relatively more paraffinic or relatively hydrogen-rich fractions and into relatively more aromatic or relatively hydrogen-poor fractions by means of various selective solvents or solvent mixtures. The separation of the more viscous oils is usually accomplished by means of an organic solvent selected from the class of solvents which have a preferential selectivity for the relatively more aromatic type compounds as compared to the relatively more paraffinic type compounds. Solvents of this class are, for example, phenol, furfural, cresols, nitrobenzene, aniline, beta beta' dichlorodiethyl ether, and the like. When employing these solvents for any given molecular weight it generally follows that in a given solvent or solvent mixture the paraffinic type hydrocarbons are the least soluble, the naphthenes next, and the aromatic and unsaturated hydrocarbons the most soluble. Solvents of this class are employed together as well as in combination with other substances, as for example, with materials of the class of liquefied normally gaseous hydrocarbons such as ethane, propane, butane and the like. It is also well-known to use substances which have the ability to modify the selectivity and solvent power of the particular solvent or solvent mixture employed.

The solvent or solvent mixture and the oil are contacted by various means, as, for example, by a batch or by multi-batch processes. However, in general, the conventional procedure is to contact the solvent and the oil in a countercurrent tower treating operation. In this type of operation the lighter phase, usually the oil, is introduced at the middle or bottom section of the tower, while the heavier phase, usually the solvent, is introduced at the upper part of the tower. The respective phases flow countercurrently under conditions adapted to secure optimum contact between the solvent and the oil. Contact between the countercurrently flowing phases is usually secured by suitable distributing and contacting means, as, for example, packed masses, pierced plates, distributing trays, and the like. Temperature and pressure conditions on the tower are adjusted to secure the formation of a solvent-poor or raffinate phase, the oil of which is relatively highly paraffinic in nature, and a solvent-rich or solvent extract phase, the oil of which is relatively highly aromatic in character. The respective phases are separated and handled in a manner to remove the solvent from the extract and the raffinate. This is usually accomplished by a distillation process, providing a sufficient differential exists between the boiling points of the solvent and the oil. Other means are also employed, as, for example, re-extraction with a secondary solvent or by washing with water and the like.

These organic solvents and extraction processes, while entirely satisfactory for securing a separation between the relatively more aromatic constituents and the relatively more paraffinic constituents of an oil such as in an operation for the production of a high quality paraffinic type lubricating oil from a petroleum oil fraction, are not particularly desirable for effecting the separation of a particular constituent from mixtures containing other constituents of a similar chemical structure. This is a disadvantage since, due to the differences in chemical and physical properties between the paraffinic type constituents, the aromatic type constituents, the hydro-aromatic or naphthenic type constituents, and unsaturated type constituents, each possesses desirable characteristics and each finds certain uses to which the others are not well suited. For example, in the higher molecular weight range, the paraffinic type constituents, due to their stability and low viscosity-temperature coefficient, are unusually well adapted for utilization in lubricating oil fractions. Aromatic type constituents, on the other hand, possess a relatively high viscosity-temperature coefficient and thus have a greater tendency to form sludge-like and similar polymerization products which considerably impair the quality of a lubricating oil. In the lower molecular weight range, the paraffinic type constituents are best adapted for use as illuminants, due to their non-smoking properties, and are also well adapted for employment as commercial solvents. The aromatic type constituents, along with certain naphthenic type and iso-paraffinic type constituents, are particularly desirable for incorporation in motor fuels. The unsaturated type constituents, as, for example, the diolefins and mono-olefins, are desirable as feed materials for polymerization and related operations. They are also employed as feed stocks in various chemical syntheses.

In order to segregate particularly desirable constituents from feed oils containing the same, other substances than conventional organic solvents and processes have been proposed. These processes are concerned with operations for effecting a more efficient and economical separation of feed mixtures into their respective constituents according to molecular weight and chemical structure. Particular solvents which have been suggested for securing these results are liquefied normally gaseous inorganic solvents of the character of sulfur dioxide and liquid anhydrous ammonia. However, we have found that sulfur dioxide is subject to limitations in the purity of the extract obtainable even at very low temperatures. Likewise, we have found that liquid anhydrous ammonia as such is not applicable to a variety of hydrocarbon separations such as is desirable in treating petroleum and mineral oils. This is due largely to its very limited range of solvent power. We have, however, discovered that unexpected desirable results are obtained providing the ammonia solvent be modified in a manner that the amount of substance dissolved therein is maintained within certain critical limits. By so doing our solvent is applicable to separations now made by liquid sulfur dioxide or sulfuric acid, and to a variety of other separations as well. In addition, improved degrees of purity and yields result.

One method for studying the type of separations possible with a given solvent is to prepare binary mixtures of representative members of the two types of constituents being considered, and determine equilibrium relationships between the binary mixtures and the solvent. These equilibrium data can then be plotted on triangular graphs, from which calculations of the solvent-to-oil ratio and number of theoretical stages necessary for a given separation can be made. (The properties of triangular graphs are covered thoroughly by Roozeboom, Die Heterogenen Gleichgewichte. They are summarized by Hunter and Nash, J. Soc. Chem. Ind. 53 95T (1934). The latter article and one by Varteressian and Fenske, Ind. Eng. Chem. 29, 270 (1937), summarize methods of calculations). In the triangular graphs each apex of the triangle represents a component of the mixture which components are the solvent and the two hydrocarbons involved. A perpendicular from each apex to the opposite side is divided into 100 equal parts. Lines which pass through these points, parallel to the opposite side, represent lines of constant percentage of the particular component represented by the opposite vertex. Any liquid mixture of three components can be represented by a point on the graph. The perpendicular distance from this point to any side is proportional to the percentage of the component represented by the opposite vertex. If two liquid solutions are mixed, the compositions of the resultant solution will be represented by a point on a straight line between the composition points of the two original solutions, and the proportion of each original component will be inversely proportional to the distance between its composition point and the final composition point. For example, in the equilibrium diagrams of Figures 1 and 2 the area under the binodal curve (Figure 1) or between the two solubility lines (Figure 2) represents a two-phase area. A solution whose composition falls within this area, under the conditions of pressure and temperature represented by this diagram, will break up into two liquid phases of definite composition. The composition of these equilibrium phases will be represented by an equilibrium or tie-line drawn through the original overall composition point and terminating at the two solubility lines. The shape of the curve and the position of the tie-lines are determined experimentally. It is evident that for any enrichment, or separation of the hydrocarbon mixture to occur, two phases must be formed. Thus, in Figure 2 either component could be made pure, but in Figure 1 a maximum purity of 73 per cent A under the conditions of the diagram would be reached, since above this value only one phase appears and no further enriching could occur. We have found that liquid anhydrous ammonia and sulfur dioxide display, in a majority of cases, equilibrium relationships similar to Figure 1. Hence, there is a limit to the purity of A and hence the yield of B obtainable with these solvents. However, when ammonia is handled according to our invention, the equilibrium relationships are modified with unexpected results which may be characterized by Figure 2. When this occurs both components of the feed mixture may be made as pure as desired. This is one advantage of our invention. Other advantages will be apparent from the further disclosures.

In order to secure a clear concept and value of a particular solvent a selectivity factor, termed beta, is employed. This factor is quite analogous to the alpha factor employed in distillation and may be represented by the following formula:

$$\text{Beta} = \frac{Y_A}{Y_B} \times \frac{X_B}{X_A}$$

in which the terms X and Y are used to denote concentrations in the raffinate and extract or solvent phases, respectively, while A and B denote, respectively, the more soluble and less soluble components or portions of the material being extracted. Through the concept of beta the limiting conditions for any separation can be determined as described by Varteressian and Fenske above mentioned. Thus, $Y_A/Y_B$ equals the ratio of the more soluble component to the less soluble component in the solvent or extract phase, and $X_A/X_B$ equals the ratio of the more soluble component to the less soluble component in the oil or raffinate phase. Beta is a numerical measure of the solvent's selectivity or the solvent's ability to preferentially dissolve one particular type of constituent to the exclusion of other tyeps of constituents.

It is known that the beta or selectivity of any particular organic solvent may be affected by the addition of other materials to the solvent. Generally as the solvent power of any solvent is increased the selectivity or beta decreases to a a marked extent. This is particularly the case when employing liquid sulfur dioxide which is of a character similar to the character of liquid ammonia. Liquid sulfur dioxde even wth the use of modifying agents is also subject to other limitations in the purity of extract obtainable, even at very low temperatures.

Organic solvents which have been found satisfactory for lubricating oil extraction and high molecular weight separations, such as phenol, chlorex, furfural, cresylic acid, etc., are unsuitable for the treatment of lighter hydrocarbons, i. e., hydrocarbon fractions boiling below a typical light lubricating oil. It is known that various substances are added to the foregoing and other solvents to obtain more or less improved operation in treating oils and particularly relatively high molecular weight hydrocarbons. In many cases such other substances are added to alter density relationships, thereby facilitating phase separation. They are also added to reduce emulsions. Their effect on the solvent power or selectively of the particular solvent to which they are added is obscure since the function and choice of such materials depends on their ability to disengage the solvent and oil more rapidly than would otherwise be possible. The selection of such substances also depends on the properties of the solvent and the oil being treated.

In some cases other liquids have been added to a particular solvent in order to alter its solvent power. The effectiveness of these added liquids depends largely on the properties and characteristics of the primary solvent to which they are added. For most of the primary solvents in present use very few modifying solvents may be extensively used due to difficulties experienced with density factors, emulsions, mutual solubility, chemical interaction, corrosion, etc. Some of the combinations in use are accompanied by unforeseen difficulties. For example, when benzol is added to liquid sulfur dioxide to adjust the solvent power of the solvent, the selectively as measured by beta drops considerably and to an almost prohibitive extent. Adding water to phenol reduce its solvent power for oil. However, the phenol-water mixtures are considerably more corrosive than either phenol or water alone. In some cases there are also emulsion troubles. Very few liquids may be added to furfural and chlorex due to their relatively great chemical reactivity. It is well-known that few, if any, liquids soluble in liquid sulfur dioxide will reduce its solvent power without chemical reaction or causing the corrosion of equipment. No wholly satisfactory solvent has yet been found for changing the dissolving power of liquid sulfur dioxide without impairment of its selectivity due to the properties of sulfur dioxide. In general, while the principle of modifying solvents for altering solvent power is relatively well understood, their applicability has been greatly restricted due to the disadvantages which their use incurs. These disadvantages include: loss of selectivity, increase in corrosiveness, the production of emulsions, difficulty in separating the modifying solvent from the primary solvent, difficulty in separating the primary solvent or modifying solvent from the hydrocarbon mixture being treated, and incompatibility of the modifying solvent with the primary solvent over a relatively wide range of concentration or hydrocarbon solubility. This is a particular obstacle if more than two products are to be obtained from any solvent treating operation. However, a principal disadvantage of employing a modifying agent to alter the solvent power of a particular solvent is that a loss in the selectivity of the solvent occurs as measured by a lower beta.

Liquid anhydrous ammonia has been proposed for certain specific separations of hydrocarbons particularly in the low molecular weight hydrocarbon range. However, in general, this solvent is not suitable for segregating the various constituents of mineral and petroleum oils due to the excessive and irregular solubility characteristics of various hydrocarbon constituents in this solvent. Toluene is completely miscible with equal parts of ammonia at 20° F., whereas ammonia will dissolve only about 3 weight per cent of methylcyclohexane at room temperature.

The solubilities of various hydrocarbons in liquid anhydrous ammonia are as follows:

TABLE I

[Temperature=110° F. Solvent=liquid anhydrous ammonia]

| Hydrocarbon | Weight per cent solubility in ammonia |
|---|---|
| n-Pentane | 21.2 |
| n-Hexane | 15.2 |
| n-Heptane | 10.0 |
| n-Octane | 6.1 |
| n-Nonane | 4.0 |
| n-Decane | 2.9 |
| n-Hexadecane | 0.2 |
| Cyclohexane | 14.5 |
| Methylcyclohexane | 13.3 |
| 2, 2, 4-trimethylpentane | 10.1 |
| Diisobutylene | 29.5 |
| Toluene | 14.3 at −16° F. |

The respective miscibility temperatures using equal volumes of various liquid hydrocarbons and liquid anhydrous ammonia are as follows:

TABLE II

| Hydrocarbon | Miscibility temperature |
|---|---|
| | °F. |
| Propane | 83 |
| Propylene | 22 |
| Butadiene | −22 |
| Butene-1 | 41 |
| Isobutene | 43 |
| n-Butane | 106 |
| Trimethylethylene | 73 |
| Pentene-2 | 76 |
| Mixed amylenes | 74 |
| Toluene | 19 |

The above two tables clearly demonstrate that liquid anhydrous ammonia is not a satisfactory solvent for the segregation of petroleum hydrocarbon constituents due to the wide range of temperatures necessary to obtain a practical solubility of hydrocarbons in the liquid ammonia. Furthermore, temperature adjustments alone are not satisfactory expedients for applying this solvent to a variety of hydrocarbon mixtures. When treating some stocks, the low temperature required to form two phases with liquid anhydrous ammonia and one of the components may be near or below the freezing point of this component, or below its flow point should its viscosity become too great. For example, it is impossible to form two liquid phases with liquid anhydrous ammonia and benzene or naphthalene due to the separation of a solid phase. Hence, neither of these compounds could be made in a pure state by this solvent. In other cases the low temperatures required may be uneconomical to produce. In the separation of butadiene from other four-carbon atom hydrocarbons it is necessary to use temperatures below about —25° F. On the other hand, in the case of the required temperatures being high, such temperatures markedly reduce the selectivity, or beta, of ammonia for in general the higher the temperature the smaller the value of beta. The relatively low critical temperature of liquid ammonia further limits the degree to which solvent power may be raised by an increase in temperature. Also high temperature values are undesirable. In many instances they make the process uneconomical by requiring unnecessarily high pressures. In extracting hydrocarbon fractions boiling around 200° C. with anhydrous ammonia the pressures would approach or exceed 600 pounds per square inch. In certain cases when reactive compounds such as diolefins are concerned, the increased temperature in many instances causes undesirable chemical reactions to occur. In addition to a loss in yield, many such compounds so formed precipitate out when the temperature is reduced later on in the process. Such precipitation causes operating difficulties and interferes with the continuity of the extraction operation. As another example, in the extraction of light oils, such as gas oils, containing naphthenic acids, temperatures above 125° C. must in general be used to obtain appreciable solubility of hydrocarbon components in the ammonia. It is well-known that above 80° C. the naphthenic acids tend to form amides with the ammonia and since these cannot be regenerated by heat, this results in a loss in solvent. A relatively large temperature change is also impractical since a reversal of phase density often occurs. That is, at one temperature the solvent phase is heavier than the hydrocarbon phase, whereas at another temperature the reverse is the case.

It is thus apparent that ammonia is not a satisfactory solvent and cannot be used commercially for a majority of the desired separations due to the fact that the yields are relatively low, that the solubilities are too restricted and limited, and that it is extremely difficult, if not impossible, to segregate various petroleum constituents such as benzene, toluene, naphthalene, and diolefins in a satisfactory pure state. Furthermore, with liquid ammonia it is frequently impractical or impossible to make a pure extract due to the miscibility temperatures for such materials being so low that the required temperatures are prohibitive or that the extractable component may not exist in the liquid state at such temperature.

Furthermore, from the knowledge of prior art it is not to be expected that these inherent disadvantages possessed by liquid anhydrous ammonia could be rectified by methods known to the art. As previously pointed out modifying agents employed in conjunction with organic solvents materially affect the selectivity or beta of the solvent. This adverse effect on the selectivity of the solvent seems to be materially aggravated when employing a solvent selected from the class of liquefied normally gaseous inorganic solvents. For example, benzene when employed in conjunction with sulfur dioxide reduces the selectivity of the sulfur dioxide to a small fraction of its former value. This greatly impairs or prohibits its use in many cases where it would otherwise be very applicable. In fact, no inorganic selective solvent has been proposed to which modifying solvents may be added without critically impairing the selectivity of the solvent.

We have, however, discovered that, providing the solvent comprise ammonia and a modifying agent, unexpected desirable results are secured. We have discovered that providing the characteristics of ammonia be modified with the desired modifying agent it is possible to treat feed oils for the production of products which otherwise could not be secured either by the use of ammonia alone or by means of closely related solvents. We have discovered that ammonia is compatible with a variety of substances capable of varying its solvent power for hydrocarbons, that when these modifying solvents for adjusting solvent power over a definite range are used, little, if any, loss in selectivity occurs, and that there is substantially no increase in corrosiveness or in emulsions. Thus, in spite of the fact that no selective inorganic solvent in present use is susceptible to modifying solvents for altering solvent power without some of the previously noted disadvantages occurring, we have discovered that ammonia is compatible with a great many substances without such disadvantages and that by proper choice of modifying solvent, the ammonia solvents may now be used for a great variety of hydrocarbon separations. We have found that in this manner it is possible to employ these ammonia solvents for selectively extracting hydrocarbons ranging from, say, ethane to relatively viscous oils. This is accomplished by adding modifying solvents to reduce or raise the dissolving capacity of the ammonia without greatly changing its other characteristics. It is further possible in this manner to maintain at or near ordinary temperatures incomplete miscibility and yet obtain appreciable solubility in the solvent of each component to be separated, thereby permitting each component to be prepared economically in any desired degree of purity, for example, as a substantially pure component. If the solvent powers of liquid ammonia are accordingly modified, we find that it can then be used for a relatively large number of hydrocarbon type separations, for example, in separating aromatics, naphthenes, paraffins, and unsaturated constituents.

According to our invention it is now possible to separate more than two components of a hydrocarbon mixture in a single integrated solvent treating operation. For example, a mixture containing aromatics, unsaturates, and, say, paraffins may be treated in a single operation to yield each of the above components substantially pure. This is accomplished by the proper choice and amount of modifying solvent. If the mixture being treated contains only one molecular type but a series of molecular sizes, these ammonia solvents may then be used to separate one molecular size from another.

In separations such as the foregoing, we have discovered that these ammonia solvents are particularly suitable in countercurrent extraction operations, and in realizing and applying the principles of reflux. Reflux extraction is not usually applicable with liquid anhydrous ammonia or sulfur dioxide.

By the use of modifying solvents of various types and in various amounts it is possible to obtain any degree of solvent power for any particular hydrocarbon component. However, we have found that it is preferable to confine this solubility to relatively definite limits, particularly at the feed point in a countercurrent extraction apparatus. We prefer that the conditions of extraction be so adjusted, that, at the hydrocarbon feed point, the solubility of the hydrocarbon in the solvent lie in the range from 5 to 30 per cent. We have further found that the selectivity, or beta, for ammonia together with a modifying solvent is closely dependent upon this hydrocarbon solubility in the solvent. The beta and the solubility control the number of stages required and the solvent-to-oil ratio needed. Figure 3, which is based on an aromatic-paraffin hydrocarbon mixture, shows typical curves for the variation of minimum solvent-to-oil ratio and minimum stages for a given separation with hydrocarbon solubility in the solvent. It clearly shows that when the solubility is too high, both the solvent-to-oil ratio and the stages required are too high to be economically feasible. Likewise, for very low solubilities, a very high solvent-to-oil ratio is required. This figure obviously applies most accurately when the hydrocarbon solubility in the solvent is constant or very nearly constant throughout the extraction path. The position of these curves will be displaced for different specific mixtures and for different type compounds, and the minimum point for solvent-to-oil ratio will be shifted, but the general shape will remain the same. In general, the amount of modifying agents is controlled so that about 5 to 30 per cent solubility is secured at the feed point. Desirable operation for the case just illustrated comprises one in which the solubility is in the range of about 15 to 25 per cent, particularly in the range of about 20 to 22 per cent. However, this optimum solubility will vary depending upon the particular feed stock being treated and upon general operating conditions. As another example, in the operation for the segregation of paraffins from olefins, the solubility should preferably be in the range from about 10 to 15 per cent.

The amount of solvent modifying agent used may vary widely and will depend on general operating conditions and upon the particular feed stock being treated. In general, the solvent mixture should comprise from about 5 to 40 per cent of a solvent modifying agent. Suitable modifying solvents can be chosen from a relatively large group. Any substance which will not react but which when added to the system will alter the solvent power of the ammonia may be used. As specific examples we might cite water, ethylene glycol, formamide, ethylene diamine, some aromatic hydrocarbons and paraffinic hydrocarbons to reduce the solvent power, and higher glycols, ethers and ether-alcohols, methanol and other alcohols, alcohol-amines, aniline, pyridine, the methylamines and other low molecular weight aliphatic amines to raise the solvent power. We have found that water, ethylene glycol, the methylamines, the lower molecular weight diamines, and higher molecular weight paraffinic or naphthenic hydrocarbons are especially effective. In some cases, we find it advisable to add one type of modifying solvent in one zone of the extraction and another type at another zone, the resulting solvent being composed of three components: ammonia; a modifying solvent for increasing the solvent power; and one for decreasing it. In general, the solvent in the solvent phase will be composed predominantly of ammonia, i. e., about 50 per cent by volume, such that the selectivity characteristics of the solvent are primarily that of the ammonia; only the solvent power is modified. Hence, it is not necessary that the modifying solvent be selective, it is only necessary that it alter the solvent power of the ammonia. Our modifying solvents should not be confused with those substances added to ammonia to change its specific gravity in order to afford better phase separation, as for example, inorganic salts. For our modifying solvents, on the other hand, the primary requisite is that they change the solubility of the hydrocarbon in the solvent, without adversely affecting the beta and they are chosen primarily on the direction and degree that they do this.

The amount of modifying solvent added depends upon the degree to which the solvent power should be changed, and hence upon the mixture being extracted and the particular modifying solvent used. Water is very potent in changing the solvent power and in general should not be used in concentrations above 25 percent. Ethylene glycol is most satisfactory in concentrations below 35 per cent. In general, the methylamines should not be added to a concentration above 40 per cent. The ammonia and the modifying solvent may partition themselves between the extract and raffinate phases in a different concentration ratio. As a result, when countercurrent treating operations are being employed, the composition of the solvent may change along the countercurrent path. In general, this composition change will have a beneficial effect, for the solvent usually decreases in solvent power because of this change as it flows through the countercurrent extraction path. This effect aids in maintaining the solubility at a more constant value, and leads to more efficient extraction.

It is not necessary that the modifying solvent be completely soluble in the liquid ammonia. A highly-refined paraffinic or naphthenic neutral oil may be added to lower the solubility in the solvent. A highly paraffinic oil is quite effective. As an example, the solubility of a mixture containing 75 per cent butadiene and 25 per cent isobutylene is 12 per cent when 1 part of the mixture is extracted with 4 parts of liquid anhydrous ammonia at −45° F. This same solubility and selectivity was obtained by adding 2.6 parts of a highly paraffinic oil to the system and extracting at +32° F. or at a 77° F. higher temperature. The use of such oils is particularly desirable when extracting low molecular weight hydrocarbons, i. e., those below 100, and especially when employing contercurrent extraction wherein the solubility is adjusted at several points in the extraction path by the addition of such oils.

Low molecular weight paraffinic hydrocarbons such as propane are suitable modifying solvents. Toluene is also effective. When the solubility is adjusted by their use the selectivity as measured by beta is not substantially affected. Thus, many separations are now possible that heretofore were impossible.

These modifying solvents may be added directly to the ammonia, or they may be added to a countercurrent treating system at several points. We have found the addition of the modifying solvent at one or more points in a countercurrent extraction path to be particularly effective. In this way the solubility is controlled so as always to be within the proper limits in order that the selectivity or beta may be high. It is frequently much more feasible and practical to control the solubility in this way than in other ways, for example, by changing the temperature.

The present process may be used in the treatment of any feed oil. It is particularly applicable in the treatment of low viscosity or non-viscous oils having molecular weights in the range of about 40 to about 400. In general, we have found it to be particularly adapted in the treatment of oils boiling in the range below the boiling range of light lubricating oil fractions and especially desirable in the segregation of relatively pure unsaturated cyclic constituents.

Operating temperatures and pressures may vary considerably. Under certain conditions the temperatures may be in the range from about 0 to 150° F. However, due to the particular nature of the solvent it is preferred that the temperatures be in the range from about 60 to 100° F. The pressures in general should be sufficient to maintain all the constituents in the liquid state and may be adjusted to regulate the solubility of the constituents in the solvent. In general, it is preferred that the pressures be in the range from about 100 to 200 pounds per square inch gage.

The solvent-to-oil ratio will depend upon the mixture being treated and on the solubility in the solvent. As indicated, the solubility should be controlled so that the amount of oil dissolved is within a certain critical range, in order that the solvent be effective and in order that a practical commercial operation be secured. Effective and practical operation is considered to be a reasonably low solvent-to-oil ratio, for example, less than 10 to 1, a relatively low number of theoretical extraction stages required, for example, less than 25, ample control of solubility and phase separation together with the ability to produce any desired degree of purity and if necessary approaching 100 per cent purity for the extractable materials in a high yield. The feed rate will be a function to a large extent of the specific feed mixture and the solvent-to-oil ratio. In general, when applying about 10 to 1 solvent-to-oil ratio the feed rate should be in the range from about 20 to 40 gallons per hour per square foot of cross sectional area when separating aromatics from paraffins or naphthenes.

In order to further illustrate the invention the following examples are given which should not be construed as limiting the same in any manner whatsoever. As already pointed out, modified ammonia solvents may be used to make a variety of separations, particularly those hydrocarbon fractions below a light lubricating oil. The following examples are used to illustrate some of the type separations possible with the modified ammonia solvents, many of which are not feasible with liquid anhydrous ammonia.

Modified ammonia solvents may be used to separate diolefins from olefins. An example of such a separation is given in the following Table III.

TABLE III

SEPARATION OF DIOLEFINS FROM OLEFINS

*Extraction of Butadiene from Isobutylene*

| Solvent | Liquid anhydrous ammonia | Ammonia plus modifying solvent |
|---|---|---|
| Temperature of extraction | 70° F. | 70° F. |
| Maximum possible purity of— | | |
| Extract | No | 100%. |
| Raffinate | | 100%. |
| Maximum possible yield of isobutylene | Separation | 100%. |
| Solvent-to-oil ratio required to make 98% butadiene and 98% isobutylene. | Possible | 10/1. |
| Throughput: gal./hr., sq. ft. in countercurrent tower. | | 20. |

We have found that by use of, for example, 10 per cent water, 35 per cent ethylene glycol, or 40 per cent ethylene diamine in the modified ammonia solvent (the remaining 90, 65, or 60 per cent being ammonia) the separation listed above can be readily made. Under these conditions of temperature, liquid anhydrous ammonia would give only one phase with the hydrocarbon mixture. By using a slightly higher temperature, or slightly less modifying solvent, we have been able to readily separate isoprene and cyclopentadiene from other five-carbon atom olefins and paraffins with similar solvents.

Olefins can be readily separated from paraffins by the solvents disclosed here. As an example we may cite the separation of propylene from propane as listed in the following table.

TABLE IV

SEPARATION OF OLEFINS FROM PARAFFINS

*Extraction of propylene from propane*

| Solvent | Liquid anhydrous ammonia | Ammonia plus modifying solvent |
|---|---|---|
| Temperature of extraction | 100° F. | 100° F. |
| Maximum possible purity of— | | |
| Extract | No | 100%. |
| Raffinate | | 100%. |
| Maximum possible yield of propane | Separation | 100%. |
| Solvent-to-oil ratio required to make 98% propylene and 98% propane. | Possible | 10/1. |
| Throughput: gal./hr., sq. ft. in countercurrent tower. | | 50. |

Again as modifying solvent we have found 8 per cent water, or 30 per cent ethylene glycol, or 35 per cent ethylene diamine to be especially satisfactory. We have also found that it is possible to separate completely isobutylene from normal and isobutane by our solvents. For this separation we prefer to use ammonia and a highly paraffinic oil as our solvent, although any other modifying solvent could be used so long as it brought the solvent power into the correct range. We have also utilized our solvents for the separation of amylenes from the pentanes, and octenes from octanes in any desired degree of purity.

Our solvents are effective in the separation of naphthenes from paraffins. As an example, we have listed data on the separation of methylcyclohexane from n-heptane in the following Table V.

TABLE V

SEPARATION OF NAPHTHENES FROM PARAFFINS

*Extraction of methylcyclohexane from n-heptane*

| Solvent | Liquid anhydrous ammonia | Ammonia plus modifying solvent |
|---|---|---|
| Temperature of extraction _____ °F__ | 100 | 100 |
| Maximum possible purity of— | | |
| Methylcyclohexane _____ per cent__ | 100 | 100 |
| n-Heptane _____ do___ | 100 | 100 |
| Maximum possible yield of n-heptane____do___ | 100 | 100 |
| Solvent-to-oil ratio required to make 95% methylcyclohexane and 95% n-heptane_____ | 20/1 | 8/1 |

In the first two tables in which comparisons with liquid anhydrous ammonia were given, it was seen that the unmodified solvent was completely miscible with both components. In the present case, however, the unmodified ammonia displays such a low solubility at ordinary temperatures that an excessively high solvent-to-oil ratio is required. For the separation listed above, we have used 25 per cent of monomethylamine, although other modifying solvents would be suitable, such as other amines, alcohols, and ether-alcohols.

Our modified ammonia solvents are especially applicable to the separation of aromatics from naphthenes and paraffins.

TABLE VI

SEPARATION OF AROMATICS FROM NAPHTHENES

*Extraction of toluene from methylcyclohexane*

| Solvent | Liquid anhydrous ammonia | Ammonia plus modifying solvent |
|---|---|---|
| Temperature of extraction _____ ° F__ | 70 | 70 |
| Maximum possible purity— | | |
| Of toluene _____ percent__ | 73 | 100 |
| Of methylcyclohexane _____ do___ | 100 | 100 |
| Maximum possible yield of methylcyclohexane from a 50-50 mixture_____do____ | 63 | 100 |
| Purity of products— | | |
| Of toluene _____ do____ | 70 | 98 |
| Of methylcyclohexane _____ do____ | 98 | 98 |
| Solvent/oil ratio for above purities_____ | ¹ 4/1 | 4/1 |

¹ For 70% toluene.

The above table shows the relative ease of separating pure toluene from methylcyclohexane. This would correspond to de-aromatizing a relatively narrow boiling naphtha cut. We employed water as a modifying solvent in this case. Ethylene glycol and ethylene diamine are also suitable. This permitted a much higher yield of the non-aromatic portion and a much higher purity of the aromatics than was possible with liquid anhydrous ammonia alone. If substantially pure toluene were to be obtained by using liquid anhydrous ammonia, temperatures as low as −10° F. would be required.

We have obtained similar results in the de-aromatizing of a wider distillation cut (boiling range 140° to 320° F.) by using a solvent-to-oil ratio of 6/1 and a similar water-containing solvent. Here again, both products could be made as pure as desired. As another example of separations of this type, we have listed in the following table the results obtained with a higher boiling feed stock.

TABLE VII

SEPARATION OF AROMATICS FROM PARAFFINS

*Extraction of methylnaphthalene from cetane*

| Solvent | Liquid anhydrous ammonia | Ammonia plus modifying solvent |
|---|---|---|
| Temperature of extraction _____ °F__ | 100 | 100 |
| Maximum possible purity— | | |
| Of methylnaphthalene _____per cent__ | 100 | 100 |
| Of cetane _____ do___ | 100 | 100 |
| Maximum possible yield of cetane____do___ | 100 | 100 |
| Solvent-to-oil ratio required to make 95% cetane and 95% methylnaphthalene_____ | 25/1 | 2/1 |

Unmodified ammonia is unsuitable for this separation due to its low solvent power for this feed stock, requiring a very high solvent-to-oil ratio. Ammonia plus about 25 per cent monomethylamine, however, gave a rapid and economical separation into products of high purity. Alcohols, ether-alcohols and other amines are also suitable as modifying solvents.

We have found, in the extraction of naphthas, that our solvents are able to separate dicyclic aromatics from monocyclics. In fact, by the proper adjustment of the modifying solvent, separations can be made between components differing only slightly in polarity, or even between different molecular weights, where the polarity of the components is quite similar. For certain separations this latter function is very pertinent and even indispensable. For example, in the preparation of pure compounds, such as butadiene, isobutylene, or cyclopentadiene, which react readily or polymerize easily, reaction products or polymers may be present in the mixture from which these components are to be separated. In many separation processes, special precautions must be taken that these reaction products which are similar chemically but different in molecular weight from the desired product do not appear in the final desired product. In our process using modified ammonia solvents, however, they are automatically eliminated from the desired product and appear in the raffinate with the other unwanted constituents. This is due to the peculiar property of modified ammonia solvents of fractionating as well as selectively extracting. In other instances, it may be desirable to fractionate certain mixtures containing compounds in various degrees of polymerization. It might not otherwise be possible or economically feasible to carry out such separations by distillation because of the instability of these components under the temperature and pressure conditions required for distillation. In these cases, solvent fractionation by ammonia solvents in this basic medium becomes a very effective and efficient process because rectification and stripping processes may be employed to full extent without the hazards that otherwise accompany extended heating in vacuum equipment which distillation necessarily imposes. It now becomes possible to segregate and purify materials that heretofore were incapable of such purification by the means available. In still other instances, it may be desirable both to extract selectively and fractionate a given mixture. For example, it may be desired to de-aromatize a gas oil and fractionate the paraffinic raffinate so as to eliminate some of the higher molecular weight components of relatively high freezing point. It is then more economical and efficient to carry out both of these separations by means of the ammonia solvents. It is obvious that in these separations according to molecular weight it is necessary to control the solvent power of the solvent and the temperature of operation within certain definite limits. This is only possible by means of the modifying solvent action already disclosed.

While our solvents are especially applicable to separations in the lower molecular weight range, we have also obtained good separation of components of light lubricating oils. For example, we have extracted a feed stock consisting of a 150 Pennsylvania neutral with a viscosity index of 100 with a solvent composed of substantially equal proportions of ammonia and monomethylamine. Using a solvent-to-oil ratio of 2.5 by weight in 10 stages with proper control of reflux, a yield of 90 per cent raffinate is possible with a viscosity index of 112. Liquid anhydrous ammonia would obviously be entirely unsuited for such a separation due to the very low solubility of the oil components in the ammonia.

From the preceding examples, which are given only by way of illustration of the wide applicability of our new solvents, it is obvious that these solvents can be used for a great variety of separations for which other solvents of a similar character are not at all suited. It is also obvious that we have discovered liquid anhydrous ammonia to be compatible with a great variety of modifying solvents, without materially affecting its selectivity, as strictly opposed to any other similarly used inorganic solvent now known.

The solvent and the feed oil may be contacted so as to use many desirable treating operations. However, preferred methods of treating a feed oil with the solvent in the present invention are shown in the attached drawings, Figures 4 and 5.

In Figure 4 is illustrated one arrangement of apparatus by which extraction with ammonia solvents may be carried out. This figure is particularly applicable to the case where the modifying solvent decreases the solvent power of the ammonia. Hence, when the extraction step is carried out at not widely varying temperatures, the concentration of the modifying solvent will tend to increase in the direction of solvent flow to maintain a somewhat constant concentration of hydrocarbon in the solvent. For purposes of description it is assumed that the solvent comprises ammonia and an optimum amount of water and that the oil being treated comprises a petroleum oil fraction that has a greater density than the solvent. The feed mixture is introduced by means of line 10 into extraction zone 11, while the solvent is introduced into extraction zone 11 by means of line 12. For purposes of description it is assumed that extraction zone 11 comprises a countercurrent treating tower containing a suitable number and arrangement of contacting and distributing means. It is also to be understood that extraction zone 11 may be equipped with various cooling or heating means so that a desired temperature or temperature gradient may be secured. The solvent and feed mixture flow in a countercurrent relationship under conditions adapted to secure the formation of a solvent extract phase which is withdrawn from extraction zone 11 by means of line 13 and a raffinate phase which is withdrawn by means of line 25. In accordance with the preferred modification of the present invention, the character of the solvent is further controlled as it flows through the phase contacting path in extraction zone 11 by the addition of a modifying agent which is introduced at a plurality of points by means of lines 85 and 84. The solvent extract phase withdrawn by means of line 13 is then passed through heat exchanger 15 by means of pump 14 and line 83. The solvent extract, after passing through heat exchanger 15, is then introduced into extraction zone 21 by means of line 18. If desired, prior to introducing the solvent extract into extraction zone 21, an additional quantity of a solvent modifying agent may be introduced by means of line 16. If an additional quantity of solvent modifying agent is introduced at this point, the mixture is preferably passed through heat exchanger 17 prior to introducing the same into extraction zone 21.

In the arrangement described, solvent extraction zone 11 functions as a stripping section, while solvent extraction zone 21 functions as an enriching section. Either zone could be made to function as both by introducing a feed between the ends of either zone. The solvent extract removed from zone 11 and introduced into the bottom of zone 21 flows upwardly and a final solvent extract is removed by means of line 43 and passed to settler 45. In accordance with a preferred modification of the invention additional quantities of a modifying agent are introduced into zone 21 by means of lines 80 and 81 and into the final solvent extract removed from zone 21 by means of line 44. By operating in this manner a phase separation occurs in settler 45 which comprises a solvent extract phase and precipitated hydrocarbon phase. At least a part of the precipitated hydrocarbon phase is removed from settler 45 by means of line 46 and returned to zone 21 by means of line 47. The remaining material is withdrawn from settler 45 by means of line 49 and passed to evaporator 50 from which ammonia is removed overhead by means of line 53, and in which a hydrocarbon phase forms. Under certain conditions it may be desirable to return a portion of this hydrocarbon phase formed in the evaporator to extraction zone 21 by means of line 51. The solvent removed overhead by means of line 53 is condensed in condenser 54, removed as a condensate by means of line 78 and returned to solvent storage 33. The liquid phase is removed from evaporator 50 and passed by means of line 55 and pump 56 into evaporator 57 which operates at a higher pressure than evaporator 50. Vapors are removed overhead from evaporator 57 by means of line 58, and may be condensed in condenser 54, and returned to solvent storage 33 as described. The liquid comprising the modifying agent and the extract oil together with some ammonia is removed from evaporator 57 by means of line 61 and pump 62, passed through heat exchanger 64 and then introduced into distillation column 65. Temperature and pressure conditions are maintained on distillation unit 65 so that the ammonia solvent remaining in the liquid phase withdrawn from evaporator 57 is removed overhead by means of line 68. This overhead fraction is condensed in coil 69 maintained in evaporator 57, is withdrawn by means of line 71, and passed to solvent storage 33. Part of this condensed ammonia may be returned to 65 as reflux by means of line 70. The solvent-free fraction comprising the extract oil and modifying agent is withdrawn from distillation unit 65 by means of line 72, passed through heat exchanger 64, through cooler 73 and then introduced into settler 74, in which a phase separation occurs between the modifying agent and the extract oil. The extract oil is withdrawn from the system by means of line 200, while the modifying agent is withdrawn by means of line 76 and passed to modifying agent storage 41. Under certain conditions it may be desirable to recycle a portion of the modifying agent to distillation unit 65 along with the feed by means of line 201. Fresh modifying agent may be introduced into the system by means of line 79. A preferred modification of the present invention is to pass a portion of the solvent vapors removed overhead by means of line 58 through heating coil 59 and then to return the condensed vapors to solvent storage 33 by means of line 60. A countercurrently flowing phase is removed from zone 21 by means of line 19, pump 20, passed through heat exchanger 15, cooler 23, and then introduced into extraction zone 11 by means of line 24 at a point near the top of 11.

The raffinate phase is withdrawn from extraction zone 11 by means of line 25 and is preferably mixed with an additional quantity of the modifying agent which is introduced by means of line 26. The mixture is then passed through heat exchanger 28 and introduced into distillation zone 202. Temperature and pressure conditions are adjusted in distillation zone 202 to remove overhead by means of line 31 the selective solvent which is condensed in condenser 30, withdrawn by means of line 32, and passed to solvent storage 33. If desired, a portion of the condensate may be returned as reflux to distillation zone 202 by means of line 203. A bottoms comprising raffinate oil and modifying solvent is withdrawn from distillation zone 202 by means of line 204, passed through heat exchanger 28, through cooler 36 and then introduced into settler 37. A raffinate oil substantially completely free of modifying agent and solvent is withdrawn from settler 37 by means of line 40 and handled in any manner desired. At least a portion of the modifying agent is withdrawn from settler 37 by means of line 38 and introduced into the raffinate phase by means of line 26, as described. Any remainder of the modifying agent is withdrawn from settler 37 by means of line 39 and passed to modifying agent storage 41. The desired amount of modifying agent may be introduced into the solvent passed to extraction zone 11 by means of line 205.

The foregoing illustration has been given as a flow diagram for the use of ammonia solvents. As described, it is especially applicable to the case when water is used as a modifying solvent. When other modifying solvents are used various modifications will be apparent to those skilled in the art. For example, if the modifying solvent boils close to ammonia, it may be desirable to extend evaporators 50 and 57 to distillation columns which may employ reflux. If the modifying solvent is lower boiling than ammonia, this may be returned to the proper storage tank by means of line 208. In the case illustrated, water, the modifying solvent, boiling in the base of distillation columns 65 and 202 serves to strip the hydrocarbon of all ammonia. When another modifying solvent is used whose volatility is between that of ammonia and the hydrocarbon being treated, it may be used to effect the stripping in a similar manner. Hence, the modifying solvent serves not only to modify the solvent power but also to strip the products of ammonia. This is a useful and valuable function. In this case it may be desirable to further strip the products leaving at 40 and 200 of this other modifying solvent in subsequent operations not shown but well-known to those skilled in the art. Another variation would be to remove the other modifying solvent entirely by lines 71 and 209 in the case that it boiled between ammonia and the hydrocarbon. In this case it may be desirable to strip the hydrocarbon products in the base of 202 and 65 with boiling water. Valves 206 and 207 would then be closed, and the water would circulate within the system as shown.

In the preceding Figure IV the flow diagram illustrated the case where a modifying solvent is used in increasing proportion in the direction of solvent flow. This would be desirable when the modifying solvent reduced the solvent power of the ammonia and when it was not desirable to operate at widely different temperatures. In other instances, a modifying solvent may be used which increases the solvent power. In these cases, it is often desirable from the standpoint of the temperatures required to remove at least part of this modifying solvent at some intermediate point in the extraction. The following Figure V illustrates one flow diagram where this is done in a manner to reduce the heat requirements as well.

In this example the feed is introduced into extraction tower 216 at point 101. This may be at either end or at any intermediate point. In this case, we prefer to introduce the feed at the end opposite the solvent entrance. These "towers" may be any countercurrent phase contacting devices, such as mixers and settlers, packed towers, etc., and may be equipped with temperature control devices so that any temperature gradients may be employed in the path. Solvent A, the solvent of greater dissolving power, such as monomethylamine-ammonia, is taken from storage tank 115 via pump and valve 180 and 181 and led into extraction tower 216 at point 102. In the case that the desired composition does not exist in storage tank 115, it may be made by adding modifying solvent B from storage tank 193 via line 225. The raffinate phase is withdrawn from tower 216 at point 165. At 166 some modifying solvent C is introduced for the purpose of stripping the raffinate of the other solvents. This modifying solvent C is in general one which will reduce the dissolving capacity of the ammonia solvent. We prefer to use water as this modifying solvent in the present illustration. The raffinate layer is then led through heat exchanger 167 into distillation column 168. Heat is supplied through closed coil 169. The solvent vapors leave through line 170 to condenser 171. Part of the condensed solvent is returned as reflux through line 173 while the remainder is taken through line 174 to solvent storage 115. The solvent-free raffinate which has been stripped by the boiling water is removed from column 168 by line 175 through heat exchanger 167, cooler 176, and settler 177. The water layer is recycled via line 178 while the raffinate is withdrawn as product. As an alternative, the water, or modifying solvent C, may be returned to storage tank 218, while the solvent added at 166 to strip the raffinate may be supplied from this same tank.

The extract layer consisting of the more soluble hydrocarbon components dissolved in the ammonia-monomethylamine solvent is withdrawn from extraction tower 216 by means of line 103 and pump 104, through heat exchangers 105 and 106 and introduced into distillation tower 107 at 108. Heat supplied by closed coil 109 evaporates part of the solvent. This solvent condensing in coil 111 supplies heat for vaporization in column 118 which is operated at a lower pressure or lower temperature than 107. If necessary, part of the condensed solvent from coil 111 is returned via 112 as reflux to keep the hydrocarbon from distilling over. The remainder is returned by lines 113 and 114 to solvent storage tank 115. The residue in tower 107 consists of all the extract hydrocarbons with part of the solvent. This is removed by line 116 through pressure reducing valve 185 to column 118, where it enters at point 117. The heat for this tower is supplied, as already pointed out, by the solvent condensing in coil 111 under a higher pressure. The residue from tower 118 is hydrocarbon with perhaps a trace of solvent. Since no methylamine, but rather pure ammonia-water, is to be used in the next tower, this residue which is drawn through line 119 is stripped in column 120 with ammonia vapors to remove the last traces of methylamine. The residue then passes through line 121 to heat exchanger 106 and thence to extraction tower 217. Vapors from the top of tower 118 consisting of substantially pure ammonia are partially condensed in 132 and totally condensed in 135. Part of the condensate is returned via line 131 as reflux while the rest is sent to Solvent B storage tank. Solvent B consists substantially of ammonia.

A monomethylamine-ammonia vapor mixture is withdrawn at such a point 123 in the tower 118 that, when freed of hydrocarbon and condensed, it can be mixed with the solvent from line 113 to yield the correct composition for extraction tower 216. This vapor mixture from 123 is led to a small enriching column 124 to remove any hydrocarbon which is then returned to the column via 129. The vapors are condensed in coil 126 which serves as the boiler for the solvent from the top of extraction tower 217. Part of the condensate is returned by 127 for reflux, the rest is returned to the storage tank 115.

Solvent for extraction tower 217 is supplied from storage tank 193 via valve 182 and pump 183. It enters the bottom of the tower at 184. In order to maintain the correct solubility throughout the tower, modifying solvent C, for example, water, can be introduced at points 160, 161, and 162. The raffinate phase from the bottom of this tower is returned to the top of tower 216 by means of line 163 via heat exchanger 105.

The extract layer from the top of tower 217, consisting of the most soluble hydrocarbon components in ammonia solvent, is led to evaporator 125 by means of line 136, pump 137, valve 138, and line 139. The heat for this evaporator, as already discussed, is supplied by the monomethylamine-ammonia vapors condensing in coil 126 under a slightly higher pressure. The ammonia vapors from the evaporator are slightly compressed by blower 141 and are introduced into tower 118 at 142. A small part of these vapors is led by line 143 to strip the methylamine from the hydrocarbon in tower 120. The residual liquid from evaporator 125, consisting of extract hydrocarbons, solvent C, and some ammonia, is taken by line 144 to coil 133 where it serves as a partial condenser for the vapors from tower 118. The liquid-vapor mixture from this coil is then taken to settler 148 from which part of the hydrocarbon is returned by line 149 and pump 150 as reflux to extraction tower 217. It may be desirable to add additional water at point 147 to aid in the stripping of the extracted hydrocarbon.

The liquid from the settler, consisting of hydrocarbon with a very little solvent and some water, is taken through heat exchanger 152 to distillation column 153. Heat supplied through closed coil 154 boils the water which steam strips the hydrocarbon. Solvent vapors from the top are condensed in 189, some returned as reflux through 191, the remainder is returned to storage through line 192. The hydrocarbon and water are withdrawn from the bottom through heat exchanger 152 to cooler 157 and settler 158. The water is then returned to storage tank 218 and the steam-stripped extract is withdrawn as a final product.

While the preceding examples have illustrated the use of the ammonia solvents in extraction towers, their application is in no manner limited to towers alone. Mixers and settlers could be used with equal effectiveness, as well as any other phase-contacting devices. These solvents are also applicable to other processes than the countercurrent ones illustrated here. Batch, multiple batch, concurrent, or any others familiar to those skilled in the art could be used equally well. The ammonia solvent may be applied to processes to produce several final products instead of the usual two. Adjustment of the solvent power to produce these extra portions by precipitation or by further solution is especially applicable. The products may be re-extracted with ammonia solvents of the same or different compositions, or any other devices known to enhance separation with other solvents, such as temperature gradients, reflux, etc., are in general applicable to these new solvents.

Thus it is apparent that by the use of modifying solvents, together with the proper temperature, the solvent power of the ammonia solvents can be varied over a wide range to suit the specific mixtures being treated, thus effecting the most efficient separation. These solvents can be removed readily from the final products and recovered practically completely. They form no tarry residues which have little or no value. No high temperature equipment is required even for the complete removal of the solvent from the final product. In addition to the examples given above ammonia solvents can be used for many other separations. For example, sulfur and many oxygenated compounds show a definite distribution ratio between the solvent and the oil phase. In some instances, particularly where there is not a great difference in the polarity of the components, ammonia solvents may effect an efficient separation according to molecular weight. Raffinates from extractions of oils with these solvents have enhanced properties in many respects. For example, they not only have a better color, but also they respond much more effectively to clay treatment. Ammonia, together with modifying solvents to give the correct oil solubility, can be used for dewaxing, and as such give very little difference between the filtering temperature and the pour point of the final product.

Ammonia is the only liquid normally gaseous inorganic solvent known which is capable of being modified with a modifying agent for securing separations herein outlined. It is, furthermore, the only solvent which may be readily separated from the feed oil and which may be also readily separated from the modifying agent. Ammonia is an inorganic solvent which together with a satisfactory modifying agent as disclosed in the present application will efficiently and economically separate complex organic substances such as hydrocarbon oils. As herein modified it is the only solvent of the character of, for example, sulfur dioxide and sulfuric acid which is wholly satisfactory for separations where these solvents have proven unsatisfactory. It possesses none of the disadvantages of sulfur dioxide or sulfuric acid. As an inorganic solvent ammonia possesses good dissolving power for low molecular weight polar substances, such as nitrogeneous and oxygenated compounds, including water. When such substances are used to modify the solvent power of ammonia, a new solvent system for extracting hydrocarbons is created. Ammonia so used bridges the gap normally existing between strictly inorganic solvents, such as sulfur dioxide, and the strictly organic type, such as phenol, furfural, chlorex, etc. In this way the advantages of both inorganic and organic solvents are realized in a single solvent-treating system.

The following definitions relate to the claims and the preceding specification.

By a predominate proportion of liquid ammonia we mean liquid ammonia together with modifying solvent such that the ammonia contributes principally to the solvent's selectivity, as illustrated in the preceding examples.

Ammonia solvent means liquid ammonia together with modifying solvent.

By a modifying solvent we mean any liquid which when added to the system will alter the solvent power of the solvent. The modifying solvent may or may not be a selective solvent, its determining characteristic being only that it will change the dissolving capacity of the liquid ammonia.

The term methylamine is used to denote mono-, di-, trimethylamine, or mixtures of these.

The term zone denotes one or more extraction stages or the equivalent which are properly interconnected, as already demonstrated, wherein continuity of flow and control of operating variables are maintained. By a first zone we mean that portion of the extraction path between which the feed oil enters and the raffinate phase leaves the system. By a second zone we mean an extraction path along the line of solvent flow beyond the point of feed oil introduction.

Relatively high dissolving capacity means the ammonia solvent dissolves the extractable component or components to a considerable degree, if not completely, and such a solvent is capable of dissolving appreciably the raffinate portions or components. Relatively low dissolving capacity means the ammonia solvent is incompletely miscible with the extractable component or components, and the solubility of such materials in the solvent is usually 20 to 30 per cent or lower, while the raffinate portions or components are relatively insoluble, i. e., the solubility of such material is of the order of 3 to 10 per cent or less.

By mineral oil we mean mixtures that are predominantly hydrocarbons, such as exist in petroleum or its fractions, or predominantly hydrocarbon mixtures obtained by processing such fractions.

The present invention is not to be limited by any theory or mode of operation but only in and by the following claims in which it is desired to claim all novelty insofar as the prior art permits.

We claim:

1. A process for separating a mineral oil into fractions of different chemical and physical properties which comprises extracting said oil in a first zone with a solvent comprising ammonia and at least one modifying solvent, removing solvent from the solvent phase, and extracting the oil so separated from the solvent phase in a second extraction zone with liquid ammonia.

2. A process for separating a mineral oil into fractions of different chemical and physical properties which comprises extracting the said oil in a first zone with a solvent comprising a predominant proportion of liquid ammonia and at least one modifying solvent, separating an oil phase from the solvent phase, and extracting the separated oil phase in a second extraction zone with liquid ammonia.

3. A process for separating mineral oil with an average molecular weight less than about 250 into fractions of different chemical and physical properties, which comprises extracting said oil with a solvent consisting of liquid ammonia together with a liquid modifying solvent soluble in said ammonia which reduces the solvent power of ammonia for said oil to form two liquid phases and controlling the amount of oil dissolved in the solvent between the limits of 5 to 30 per cent by weight by addition of said modifying solvent.

4. A process for separating mineral oil with an average molecular weight less than about 250 into fractions of different chemical and physical properties, which comprises extracting said oil with a solvent consisting of liquid ammonia together with a liquid modifying solvent soluble in said ammonia which reduces the solvent power of ammonia for said oil to form two liquid phases, said extraction being carried out at temperatures in the range of from about 0° F. to about 150° F., and at a pressure sufficient to maintain the ammonia solvent as a liquid phase and controlling the amount of oil dissolved in the solvent between the limits of 5 to 30 per cent by weight by addition of said modifying solvent.

5. A process for separating mineral oil with an average molecular weight less than about 250 into fractions of different chemical and physical properties, which comprises extracting said oil with a solvent consisting of liquid ammonia, a minor proportion of methylamine and liquid modifying solvents soluble in said ammonia which reduce the solvent power of ammonia for said oil to form two liquid phases and controlling the amount of oil dissolved in the solvent between the limits of 5 to 30 per cent by weight by addition of said modifying solvents.

6. A process for separating mineral oil with an average molecular weight of less than about 250 into fractions of different chemical and physical properties, which comprises extracting said oil with a solvent consisting of liquid ammonia together with water as a modifying solvent to form two liquid phases and controlling the amount of oil dissolved in the solvent between the limits of 5 to 30 per cent by weight by addition of said water.

7. A process for separating mineral oil with an average molecular weight less than about 250 into fractions of different chemical and physical properties, which comprises extracting said oil in a first zone with a solvent consisting of liquid ammonia and a modifying solvent soluble in liquid ammonia to reduce its solvent power for said oil, passing the ammonia liquid solution to a second zone, adding in the said second zone additional modifying solvents to further reduce the dissolving capacity and to control the amount of oil dissolved in the solvent between the limits of 5 to 30 per cent by weight, precipitating oil from the ammonia solution, and obtaining a further extraction of the said resulting mixture.

8. A process for separating mineral oil with an average molecular weight less than about 250 into fractions of different chemical and physical properties which comprises extracting said oil with liquid ammonia in a countercurrent phase contacting path, and reducing the dissolving capacity of the ammonia solvent as it passes along said path, by adding a liquid modifying solvent soluble in liquid ammonia at points along said path to control the amount of oil dissolved in the solvent between the limits of 5 to 30 per cent by weight.

9. A process for separating mineral oil with an average molecular weight less than about 250 into fractions of different chemical and physical properties, which comprises extracting the said oil in a first zone with liquid ammonia, passing the ammonia solution to a second zone, adding to the said second zone a minor proportion based on the liquid ammonia of a liquid modifying solvent soluble in liquid ammonia to reduce the dissolving capacity of the ammonia for said oil and to control the amount of oil dissolved in the solvent phase between the limits of 5 to 30 per cent by weight, and further extracting in the said second zone.

10. In a process for separating mineral oil with an average molecular weight less than about 250 into fractions of different chemical and physical properties, the step of controlling the solubility such that the concentration of the oil dissolved in the solvent is between 5 and 30 per cent in an extraction path wherein a raffinate phase flows in the said extraction path countercurrently to an extract phase consisting of liquid ammonia, a liquid modifying solvent to decrease the solvent power of the liquid ammonia, and dissolved hydrocarbons.

11. In a process for separating mineral oil with an average molecular weight less than about 250 into components of different chemical and physical properties, the step of purifying the components by controlling the solubility such that all of the components of the oil are incompletely soluble in an ammonia solvent throughout an extraction path wherein a raffinate phase flows countercurrently to an extract phase consisting of liquid ammonia, a liquid modifying solvent to reduce the solvent power of the liquid ammonia and dissolved hydrocarbons the amount of hydrocarbons dissolved in the ammonia solvent being controlled between the limits of 5 to 30 per cent by weight.

12. A process for separating mineral oil with an average molecular weight less than about 250 into fractions of different chemical and physical properties, which comprises extracting said oil in a first zone with liquid ammonia containing a liquid modifying solvent to reduce its dissolving capacity, controlling the solubility of the dissolved oil between 5 and 30 per cent in an extract phase, passing the said extract phase to a second extraction zone, further modifying the solvency of the ammonia solvent in the said second zone so that the component to be extracted is incompletely miscible with the ammonia solvent.

13. A process for separating mineral oil with an average molecular weight less than about 250 into fractions of different chemical and physical properties which comprises extracting said oil in a first zone with a solvent consisting of liquid ammonia and a minor proportion of methylamine, passing the solvent phase to a second extraction zone, continuing the extraction in the said second zone wherein water is added to the ammonia solvent containing methylamine to control the solubility of the oil in the solvent between the limits of 5 to 30 per cent by weight and to separate an oil phase, and recycling the said separated oil phase for extracting the solvent phase to the first extraction zone.

14. A process for separating mineral oil with an average molecular weight less than about 250 into fractions of different chemical and physical properties which comprises extracting said oil in a first zone with a solvent consisting of liquid ammonia containing a non-reactive water miscible modifying solvent, and reducing successively in a series of zones the dissolving capacity of the said solvent by further additions of said modifying solvent to maintain the solubility of oil in the solvent between the limits of 5 to 30 per cent.

15. Process in accordance with claim 14 in which the dissolving capacity of the solvent is reduced in successive zones by the addition of a modifying solvent other than the modifying solvent present in the liquid ammonia introduced into the first zone.

16. Process in accordance with claim 14 in which the dissolving capacity of the ammonia is reduced in the successive zones by the addition of a paraffinic type oil at at least one point.

17. A process for separating mineral oil with an average molecular weight less than about 250 into fractions of different chemical and physical properties which comprises introducing the feed mineral oil at an intermediate point in an extraction zone, countercurrently contacting said mineral oil with a solvent consisting of liquid ammonia and a minor proportion of methylamine under conditions to form a solvent extract phase and a raffinate phase, introducing a liquid modifying solvent into said solvent extract phase to reduce the dissolving capacity of the ammonia at at least one point between the points where the feed oil enters and the solvent extract phase leaves the extraction zone and controlling the amount of oil dissolved in the solvent phase between the limits of 5 to 30 per cent by weight by addition of said modifying solvent.

18. Process in accordance with claim 17 in which the modifying solvent added to reduce the dissolving capacity of the ammonia is water.

19. A process for separating mineral oil components of similar chemical structure into fractions of different molecular weights which comprises extracting the said oil with a solvent consisting of liquid ammonia and a minor proportion of methylamine together with a liquid modifying solvent which reduces the dissolving capacity of the ammonia under conditions that there is formed a solvent phase containing predominately the relatively lower molecular weight components and an oil phase containing predominately the relatively higher molecular weight components and controlling the amount of oil dissolved in the solvent phase between the limits of 5 to 30 per cent by weight by addition of said modifying solvent.

20. A process for separating mineral oil with an average molecular weight less than about 250 into fractions of different chemical and physical properties which comprises selectively extracting the polar constituents from the oil by means of a solvent consisting of liquid ammonia and minor proportions of methylamine and of water, adjusting the dissolving capacity of the ammonia by adding additional methylamine and water so that the amount of oil dissolved in the solvent is between the limits of 5 and 30 per cent by weight, and re-extracting the raffinate with the said solvent of adjusted dissolving capacity to give fractions of different molecular weights.

21. A process for separating mineral oil with an average molecular weight less than about 250 into fractions of different chemical and physical properties which comprises extracting said oil with a solvent consisting of liquid ammonia together with ethylene glycol as a modifying solvent to form two liquid phases.

WILLIAM J. SWEENEY.
MERRELL R. FENSKE.
GEORGE H. CUMMINGS.